United States Patent [19]

Sutor et al.

[11] Patent Number: 5,671,969
[45] Date of Patent: Sep. 30, 1997

[54] GUIDE MECHANISM FOR PLATES

[75] Inventors: Johannes Sutor, Düsseldorf; Michael Lenders, Meerbusch, both of Germany

[73] Assignee: Westmont Technik GmbH & Co. KG, Germany

[21] Appl. No.: 512,091

[22] Filed: Aug. 7, 1995

[30] Foreign Application Priority Data

Aug. 9, 1994 [DE] Germany .................. 9412816 U

[51] Int. Cl.⁶ ........................................................ B60J 7/00
[52] U.S. Cl. .......................... 296/214; 296/215; 160/202; 16/91; 47/414
[58] Field of Search .................................. 296/216, 220, 296/223, 214, 215; 16/91, 97, 98; 49/420, 414, 425, 421; 160/202

[56] References Cited

U.S. PATENT DOCUMENTS

| | | | |
|---|---|---|---|
| 1,787,451 | 1/1931 | Mohun et al. | 49/420 X |
| 2,339,309 | 1/1944 | Votypka | 49/425 X |
| 2,516,702 | 7/1950 | Kagan | 16/91 X |
| 4,852,938 | 8/1989 | Hirshberg et al. | 296/214 |
| 4,936,623 | 6/1990 | Huyer | 296/214 |
| 5,287,655 | 2/1994 | Harvey | 49/420 |

FOREIGN PATENT DOCUMENTS

| | | | |
|---|---|---|---|
| 608869 | 8/1994 | European Pat. Off. | 49/425 |
| 819639 | 11/1951 | Germany | 296/216 |
| 4127624 | 8/1992 | Germany . | |
| 551257 | 11/1956 | Italy | 296/223 |
| 4090924 | 3/1992 | Japan | 296/214 |
| 573355 | 11/1945 | United Kingdom | 296/220 |

*Primary Examiner*—Dennis H. Pedder
*Attorney, Agent, or Firm*—Vickers Daniels & Young

[57] ABSTRACT

The invention is directed to a guide mechanism for plates and a sun protection system under a translucent sun roof in an automobile. The invention comprises at least two plates having guide blocks non-rigidly attached thereto and provided at each end of the plates. The guide blocks are adapted to slide within two opposing guide tracks located within guide sections in the roof of the automobile. Each of the guide blocks includes an elastic spring device which coacts with the plate whereby uneven torque forces caused by sliding of the plates and which causes friction at the guide track is minimized.

25 Claims, 4 Drawing Sheets

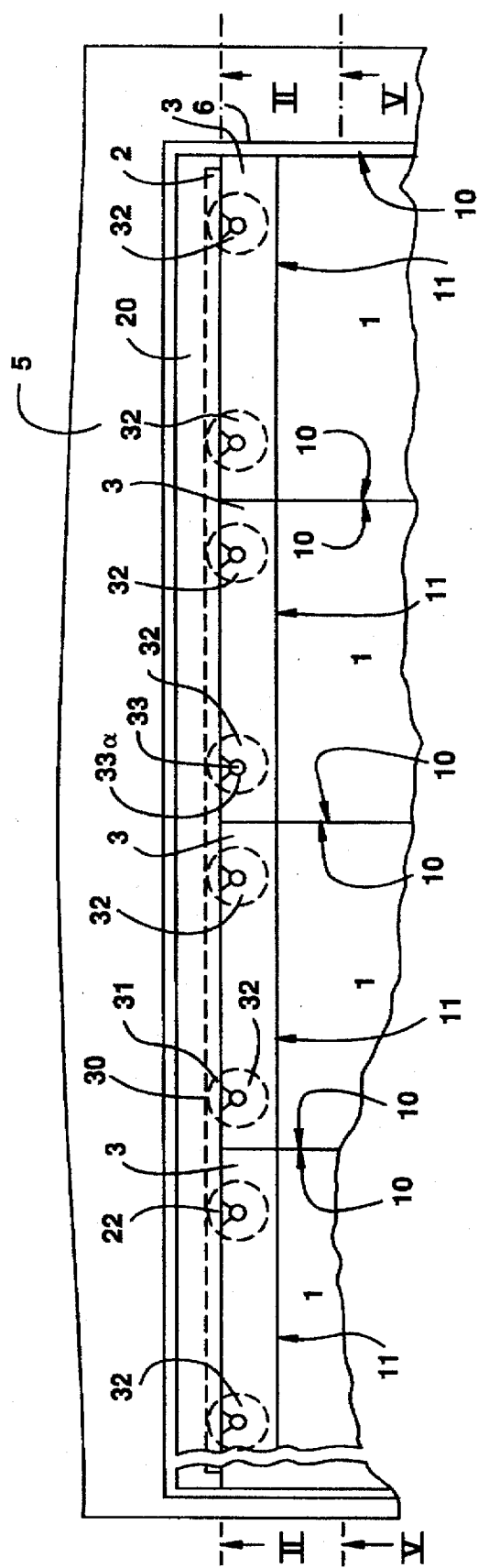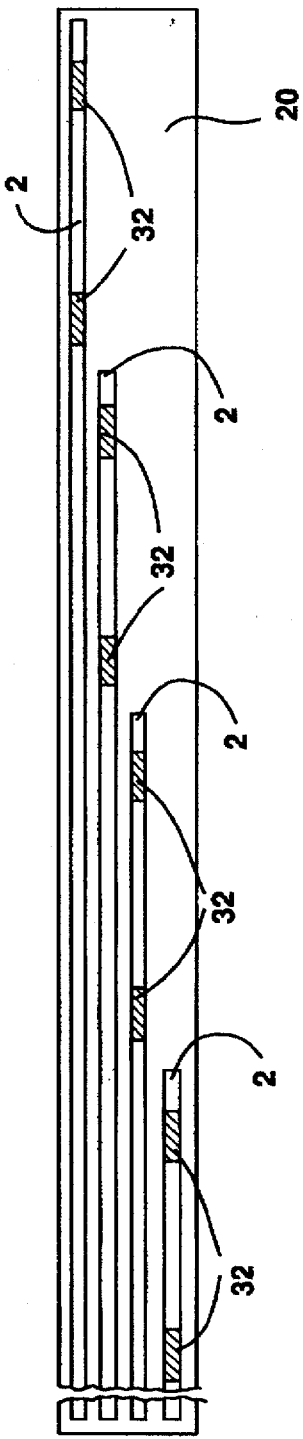
FIG.1
FIG.2

GUIDE MECHANISM FOR PLATES

The invention concerns a guide mechanism for plates with guide blocks attached or provided as one part at each end of a plate, and at least two guide tracks, each of which carrying at least one of the guide blocks belonging to the plate, placed in essentially constant intervals in the guide sections.

BACKGROUND OF THE INVENTION

In particular, the invention concerns the field of application of plate guide mechanisms in a sun protection system for translucent sun roofs in cars; it concerns all types of such car roofs, such as sliding roofs with a sliding cover plate below the roof layer of a car roof, spoiler roofs with cover plates that tilt up out of the roof opening and slide back, opposite to the car's direction of travel, lift roofs, folding roofs and other types of openings in cars.

To move the plates in the plate guide mechanisms that are known to the art, the plates must be driven with equal force at both plate ends in the proximity of their guide blocks or at the guide blocks themselves, because otherwise the plates would jam very quickly under the effect of friction and the high length-width ratio of the plates. It is indeed possible to reduce the danger of jamming by widening the plates, but a correspondingly wide storage area is required for such wide plates when the plate mechanism is open; in the case of car roofs installed manufacture of the car, in particular, this space is very difficult to provide.

SUMMARY OF THE INVENTION

To prevent a guide block from jamming in a guide track in plate guide mechanisms for carrying plates with a high length-width ratio, the invention provides that the plates and/or the guide blocks be equipped with elastic spring devices that act in the longitudinal direction of the plates.

If a force is applied to a plate inserted in guide tracks in the direction of the degree of freedom defined by the guide tracks by way of guide blocks placed at the ends of the plate, a torque is produced that tilts the plate in its plane of motion if the forces being applied to the plate do not add up with exact symmetry to the median line. This torque is met by a restoring force conveyed through the plate components placed against the guide track. This restoring force increases the friction between the guide blocks and the guide track, and results from a longitudinal force with a parallel component to the longitudinal extension direction of the plate, applied to the plate and the guide blocks.

The invention-specific elastic spring devices and the plates are extended or compressed by the longitudinal force. By arranging the elastic spring devices in a suitable manner, taking the position of the guide blocks with respect to the guide tracks into account, the compression or extension of the elastic spring devices counter the torque tilting the plate, by means of the restoring torque produced by the restoring force.

The invention-specific plate guide mechanism makes it possible to dispense with an actuation of the guide blocks or plates in proximity to the guide blocks, and therefore to have the force required to move the plate applied at any point along the length of the plate. Therefore, for instance, plates carried by invention-specific guide mechanisms can be moved by hand.

Although it is proposed as an advantageous design of the invention to provide springs as the elastic spring devices, in particular leaf springs, the elastic spring devices can be chosen freely. It is also possible, in particular, to design the plate itself as an elastic spring device, such that the plate itself, because of its internal stress, contributes the necessary longitudinal stress, for instance forming an arch in its longitudinal direction. On the other hand, suitable elastic spring devices may be used to prevent excessive arching of the plates.

To compensate for tolerances and/or to prevent rattling noises, it may be advantageous to apply a longitudinal force to the elastic spring devices, as well as the plate and the guide blocks, under all conditions of operation. Consequently, the guide blocks or components of the guide blocks in contact with the guide tracks, are pressed against the guide tracks, removing the play from the plate guide mechanism.

In the primary intended application of sun protection systems consisting of translucent sun roofs for cars, the plates are subject to very wide temperature fluctuations, ranging from outside winter temperatures of about −20° C. to temperatures of about 90° with strong sun radiation. The temperature fluctuations produce sharp contractions or expansions of the plates, so that it has not been possible in the past to ensure a consistent and trouble-flee plate guidance mechanism under all conditions. By selecting the proper elastic spring devices, or the spring constant, it is possible to compensate for temperature-related contractions and expansions, and to keep the plate free of play and free of any significant arching under such conditions as well.

Furthermore, it is possible to make the longitudinal force acting on the plate under all operating conditions so large that the restoring force caused by the tilting increases the pressure against the guide track, and therefore the frictional force retarding the movement of the plate, only to an insignificant degree.

An especially advantageous design of the invention-specific plate guide mechanism consists of incorporating devices in the plate, or at least in one of the guide blocks, to align the guide block or at least one of the components of the guide block set in the guide track in a plane essentially parallel to the guide tracks with respect to the guide tracks carrying the guide blocks. The alignment devices make it possible to keep at least one of the guide blocks in an optimal position with respect to the guide track containing the guide blocks while the plate is in motion. Because of its optimal position with respect to the guide track, this guide block counters the forces that occur in a direction perpendicular to the plane defined by the guide tracks and by the longitudinal extension direction of the plate, and therefore lessens the danger of the plate jumping out of its track, even when the plate is titled so much that the other guide block is no longer sufficiently well set in its guide track.

When using alignment devices with two pivots, it is possible to hold both guide blocks in their optimal positions with respect to the guide track while the plate is being tilted, and therefore to lessen the danger of the plate jumping out of its track even more.

The alignment devices can also have elastic spring components, so that the alignment devices counter the torque that causes the guide blocks or the component(s) of the guide block(s) to tilt with respect to the plate. The effect of the alignment devices of countering the tilt of the plate can be increased, to advantageous effect, by placing the elastic spring components as close to the longitudinal edges of the plate as possible. The design form of an elastic spring device that acts essentially in the longitudinal direction of the plate and of the elastic spring components of the alignment devices comprised in the plate guide mechanism can be simplified by providing for a design in which the elastic spring devices acting essentially in the longitudinal direction of the plate include the elastic spring components of the alignment devices.

The combination of the elastic spring components of the alignment devices with the elastic spring devices acting essentially in the longitudinal direction of the plate may be achieved in an especially simple and effective way by equipping the elastic spring devices acting essentially in the longitudinal direction of the plate with two spring-action components placed at each longitudinal edge of the plate. If a force is applied to the plate with a component parallel to the guide tracks, this leads to greater stress on the elastic spring device component placed at the from or back of the longitudinal edge, with respect to the direction of force, where the extent of this effect will depend on the position of the pivot or pivots. On the other hand, the elastic spring component placed at the back or front longitudinal edge, with respect to the direction of force, is relieved of stress. Consequently, the plate tilts, since the application of stress to the elastic spring devices causes them to shorten, while a relief of stress on the elastic spring devices causes them to lengthen.

It is evident that plate guide mechanisms in which the plate or the guide blocks have devices to align the guide blocks in the manner described above can be used to advantageous effect independently of the elastic spring devices acting essentially in the longitudinal direction of the plate. A tilting movement causes the effective length of the plate between the guide tracks to be shortened, and therefore reduces the friction between the guide tracks and guide blocks that occurs when the plate is in danger of jamming between the guide tracks.

It is also conceivable that guide mechanisms running parallel to the longitudinal direction of the plate, placed either on the plate or on the guide blocks, serving to carry the components of the plate or the guide blocks which are connected to the elastic spring devices and which can be pressed against each other in the longitudinal direction of the plate, may also serve as alignment devices due to their play.

An especially advantageous design of the invention-specific plate guide mechanism consists of executing the bearing of the guide blocks in the guide tracks in the form of a rolling bearing. This leads to a reduction in the friction that occurs between the guide blocks and the guide track.

It is evident that in the case of a fixed bearing design, a similar effect to that achieved by the alignment devices may be attained by retaining the outer form of roller bodies and the convex areas lying against the guide track, in particular the convex areas at the front, in the direction of motion of the plate, since the plate or the guide blocks roll through these convex areas when the threat of jamming arises, and the surface effectively carded is greater than if these areas adjacent to the guide track did not have a convex design, in spite of a tilting of the guide blocks in the guide tracks.

Moreover, it is advantageous to equip the guide blocks with two roller bearings each. Both of these roller bearings should be mounted at about the level of the longitudinal edges of the plate, thus, as far apart from each other as possible in the main direction of motion, so that the guide mechanism can counter the forces or torque applied to the motion of the plate with as little restoring force as possible, so that the resulting friction is not too great.

It is evident that the design of the bearings of the guide blocks in the guide tracks as rolling bearings or as convex areas may be applied to advantageous effect, independently of the elastic spring forces acting essentially in the longitudinal direction of the plate.

The above-mentioned components, as well as those listed under the claims and described in the design example, are not subject to any special conditions or exceptions with regard to size, shape, choice of materials and technical conception, so that the selection criteria customary in every special field of application may be applied without restrictions.

Other details, characteristics and advantages of the subject of the invention are provided in the following description of the diagram that goes along with it, in which—by way of example—preferred designs of the invention-specific plate guide mechanism are presented.

BRIEF DESCRIPTION OF THE DRAWINGS

FIG. 1 shows a schematic representation of an invention-specific plate guide mechanism in plan view;

FIG. 2 shows the plate guide mechanism according to FIG. 1 in cross-section along the line II—II from FIG. 1;

DETAILED DESCRIPTION OF THE INVENTION

Figure 3:
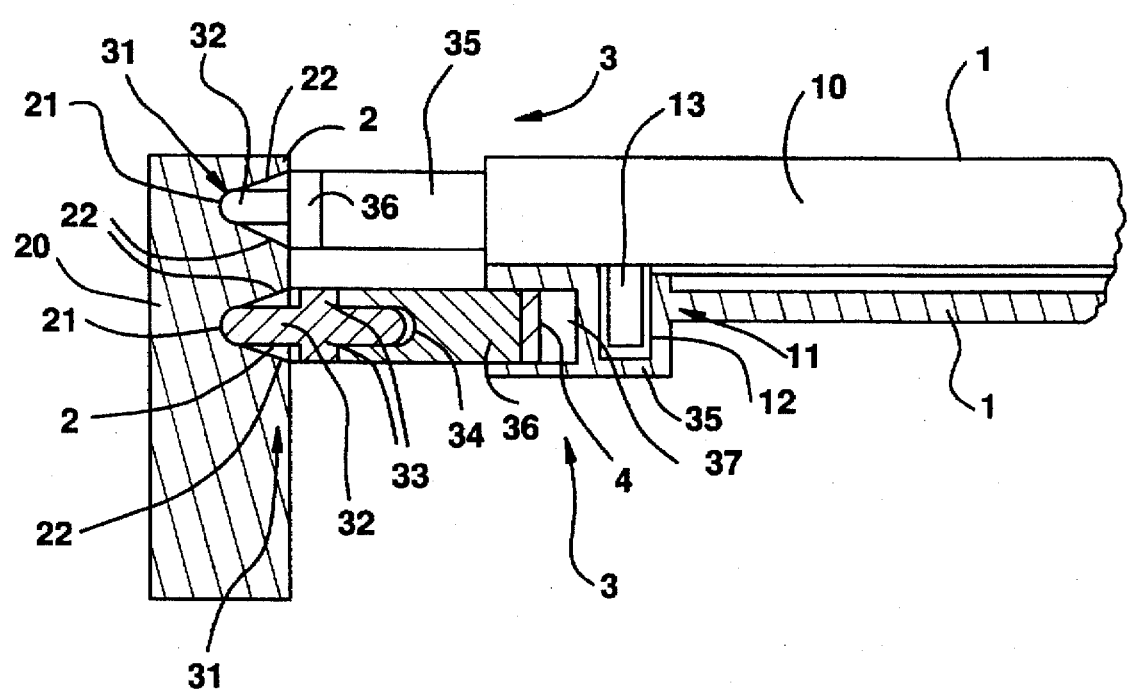
FIG. 3 shows a cross-section through the plate guide mechanism according to FIG. 4, along the line III—III from FIG. 4.

FIG. 1 shows an area of an automobile roof 5 surrounding a guide form 20 comprising several guide tracks 2 of an invention-specific guide mechanism for plates 1 located underneath a translucent sun roof 6. The guide tracks 2 hidden in the face-on view by the guide form 20 are represented by dashed lines. Each of the plates 1 has two plate edges 10 as well as two plate ends 11 and mounted in one guide track 2 by way of guide block 3 attached to each plate end 11. This illustration shows only the plate end 11 that pertains to the one guide track 2.

The guide blocks 3 comprise convex components 30 or roller bearings 31 set in the guide tracks—only one component 30 and one roller bearing 31 are assigned numbers in the example. The roller bearings 31 are shown by the rolls 32 placed in the guide blocks 3 and represented by dashed lines. The rolls 32 are mounted at about the level of the edges 10 of the plate 1 assigned to the rolls 32 on the corresponding guide block 3.

FIG. 2 shows a staggered arrangement of the guide track 2, each assigned to a plate 1 and positioned in the guide section 20. The rolls 32, each assigned to a plate 1, are mounted in the guide track 2 belonging to the corresponding plate 1.

FIG. 3 shows the mounting of the rolls 32 in the guide tracks 2 that run through the guide section 20. In cross-section, the guide track 2 have a concave area conforming to the surface of the roll 32, as well as splayed sides 22 widening out toward the plate 1.

The guide blocks 3 comprise a component 35 provided at the plate, as well as a component 36 holding the rolls 32. A leaf spring 4 forming the elastic device is provided between the components 35 and 36. The component 35 has a recess 12 opening toward the top, into which a catch 13 of the plate 1 positioned above it is inserted. Furthermore, the component 35 has a recess 37 that serves both to hold the component 36 and to hold the leaf spring 4.

Figure 4:
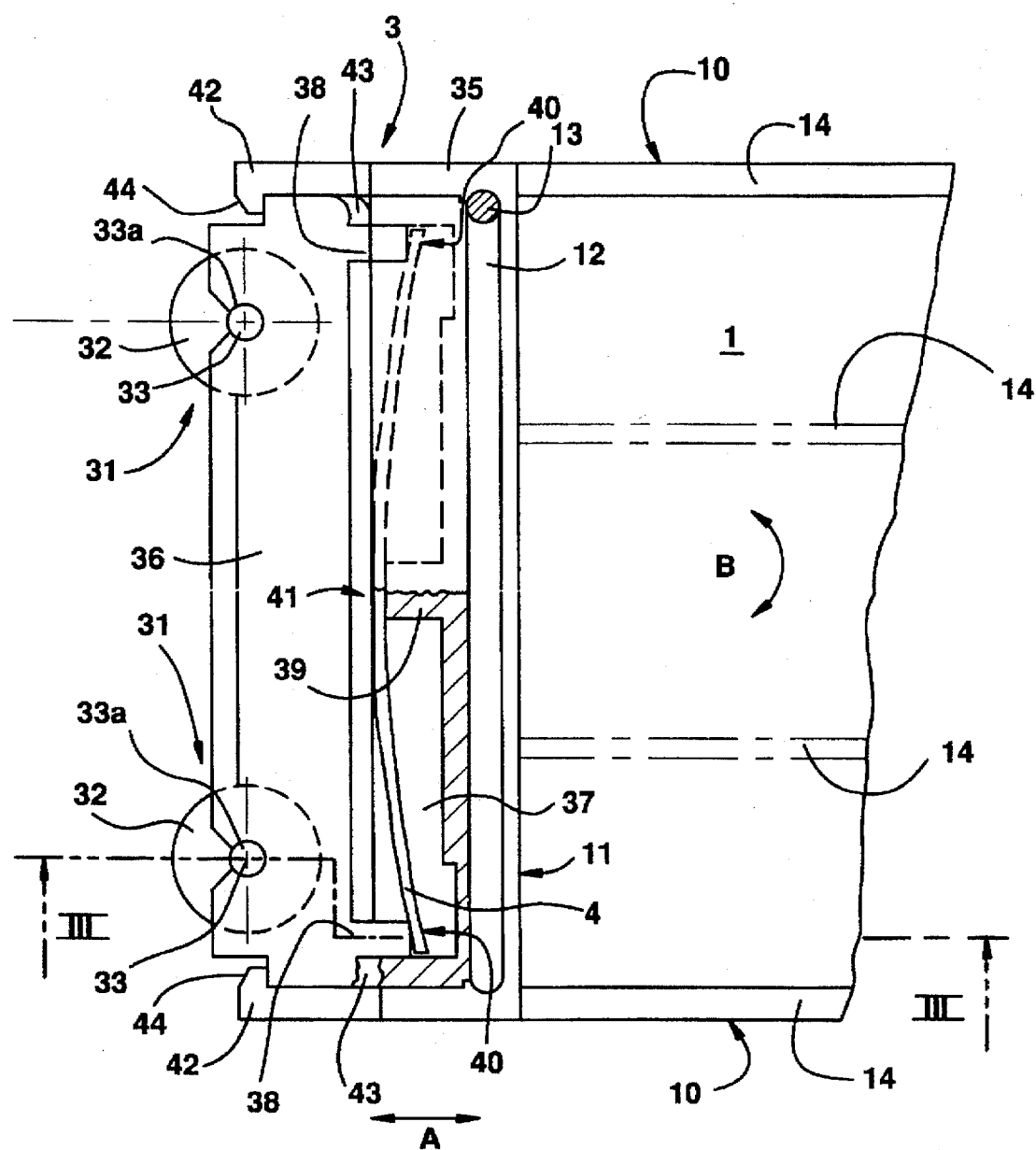
FIG. 4 shows a guide block connected to a plate with elastic spring devices, in plan view—partially exploded

FIG. 4 shows the component 35 in partially exploded view, revealing the recess 37 in which the spring 4 and the component 36 are held by way of two extensions 38 provided in the component 36. The leaf spring 4 lies against stops 40 located on the front sides of the extensions 38. In the middle of the recess 37 an extension 39 of the component 35 is located, with a stop 41, against which the leaf spring 4 also lies.

The component 35 also has two projections 42, with two guide rails 43, which hold the component 36 to its bearing. To keep the component 36 in its intended position, especially before adding the plate 1 to the assembly, ratchets 44 are provided at the projections 42, which grip the projections 42 of the component 36 that lock into the guide rails 43.

The rolls 32 provided in the recesses 34 of the component 36 of the guide block 3 have axially-mounted journals 33, mounted in bearings 33a (FIG. 4, and schematically represented in FIG. 1).

FIG. 4 also shows the catch 13 of the plate positioned over the depicted plate 1 which moves in the recess 12 of the guide block 3. If the plate 1 shown in FIGS. 1 and 2 at the far right moves toward the left, it moves the plate 1 located directly below it on the path dictated by the recess 12 along with it. In this way, the other plates 1 can also be moved to the left, and the opening covered by the plates can be opened. To close this opening, the uppermost plate is moved to the right, carrying the plates 1 positioned below it along with it by way of the catches 13 that run along the recesses 12.

The spring 4 positioned between the stops 41 and 42 makes it possible to move the component 36 with respect to the plate 1 in the longitudinal direction of plate 1, as suggested by the two-pointed arrow A.

Because of the play between the projections 42, or the guide blocks 43 and the component 36, a tilting motion of plate 1 with respect to component 36 is also made possible, as represented by the two-pointed arrow B. As a result, component 36 of the guide block 3 can run along the corresponding guide track in an optimal manner.

The guide block 3 also has two components 35 and 36 with spring action relative to each other that can be slid in the longitudinal direction of the plate as well as titled in a plane parallel to the guide tracks. While the median value of both stops 40 or the forces applied to the areas of the leaf spring 4 is the longitudinal force applied to the plate, the difference of these forces gives rise to the torque, which attempts to align the component 36 with respect to the component 35.

By positioning the stops 40 in the proximity of the plate edges 10, the torque acting to align the component 36 is maximized. Furthermore, by shortening the distance between the stops 40 and 41, in particular, therefore, by lengthening the extension 39 or the stop 40, the spring force of the leaf spring 4 is increased to advantageous effect. This leads to an advantageous increase both of the longitudinal force applied and of the torque acting to align the component with respect to the component 35.

The breakdown of the guide blocks 3 into essentially four parts, i.e., the leaf spring 4, the component 35 and 36 and the rollers 32, allows for especially easy assembly of the guide blocks. Furthermore, simple measures such as shifting or widening the stops 40 or 41 or by adding similar stops to the stops 40 and 41, the spring force of the elastic devices resp. the leaf spring 4 can be adapted to the conditions at hand.

In order to prevent a sagging of the plate 1 (FIG. 4), lengthwise projections are provided at the plate 1, parallel to the longitudinal direction of the plate 1, as plate supports 14. The plate supports 14 mounted on the reverse side of the plate are represented by a dashed line. The plate supports 14 have a component leading away from the plane formed by the plate 1, so that the plate 1 is stabilized, to advantageous effect, against forces acting perpendicularly to this plane.

Figure 5:
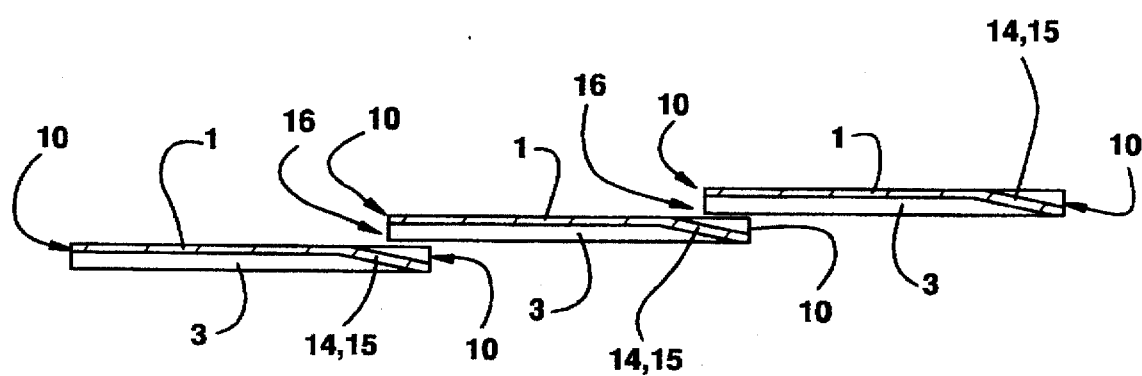
—and FIG. 5 shows a cross-section of plates placed in accordance with FIG. 1, along the Line V—V in FIG. 1.

In the design example shown in FIG. 5, a plate support 14 is formed by a splayed area 15 of the plate 1 running parallel to the longitudinal direction of plate 1. Furthermore, the splayed areas 15 enlarge the ventilation slits 16 located between the plates 1 when the opening is uncovered. These ventilation slits 16 can also service to let in a small amount of the sunlight that is essentially blocked by the plates 1.

By changing the strength of the plate 1 as well as the distance of the guide tracks 2 from each other, or by regulating the overlap or the width of the plates 1, the size of the ventilation slot 16 may be regulated.

It is evident that the plate supports 14 running parallel to the longitudinal extension direction of the plates 1 do not need to extend over the entire length of the plates 1, in order to stabilize the plate 1 in an advantageous manner.

Having thus described the invention, it is claimed:

1. A guide mechanism for plates of a sun protection system under a translucent sun roof in an automobile, comprising at least two plates with guide blocks elastically attached and provided at each end of each of said two plates and at least two guide tracks, each guide track carrying at least one of the guide blocks belonging to each of the plates, said guide tracks placed at essentially constant intervals in a corresponding guide section, each of the guide blocks having an elastic spring device coacting with each of the plates whereby uneven torque forces caused by sliding of the plates and which causes friction at the guide track is minimized.

2. The plate guide mechanism according to claim 1, wherein the guide tracks are parallel to a direction of motion for the plates, said guide blocks of at least one plate being set into the guide tracks carrying the guide blocks by at least two rolling bearings at the edge of the plates, placed one after the other in the direction of motion for the plates.

3. The plate guide mechanism according to claim 2, wherein the plates extend longitudinally between guide tracks, each of the elastic spring devices causing a longitudinal force to be applied in a direction parallel to the longitudinal extension direction of the plate and between each of the plates and the corresponding guide block.

4. The plate guide mechanism according to claim 2, wherein each said guide block includes at least two components, each said elastic spring device causing at least one of the components of the guide blocks to set in the guide track in a plane essentially parallel to the guide track.

5. The plate guide mechanism according to claim 4, wherein said at least one of the components coacts with the plate via the elastic spring device.

6. The plate guide mechanism according to claim 5, wherein said guide blocks include at least two spring-action areas located adjacent each longitudinal edge of each plate.

7. The plate guide mechanism according to claim 1, wherein the plates extend longitudinally between guide tracks, each of the elastic spring devices causing a longitudinal force to be applied in a direction generally parallel to the longitudinal extension direction of the plate and between each of the plates and the corresponding guide block.

8. The plate guide mechanism according to claim 7, wherein each said guide block includes at least two components, each said elastic spring device causing at least one of the components of the guide blocks to set in the guide track in a plane essentially parallel to the guide track.

9. The plate guide mechanism according to claim 8, wherein said at least one of the components coacts with the plate via the elastic spring device.

10. The plate guide mechanism according to claim 9, wherein said guide blocks include at least two spring-action areas located adjacent each longitudinal edge of each plate.

11. The plate guide mechanism according to claim 11, wherein each said guide block includes at least two components, each said elastic spring device causing at least one of the components of the guide block to set in the guide track in a plane essentially parallel to the guide track.

12. The plate guide mechanism according to claim 11, wherein said at least one of the components coacts with the plate via the elastic spring device.

13. The plate guide mechanism according to claim 12, wherein said guide blocks include at least two spring-action areas located adjacent each longitudinal edge of each plate.

14. The plate guide mechanism according to claim 1, wherein said guide blocks include at least two spring-action areas located adjacent each longitudinal edge of each plate.

15. The plate guide mechanism according to claim 1, wherein said elastic spring device comprises a leaf spring.

16. The plate guide mechanism according to claim 15, wherein said one spring-action surface of the leaf spring is placed symmetrically against two stops set in the guide block located adjacent each longitudinal edge of each plate, and that the other spring-action surface of the leaf spring is placed against a stop positioned at about the middle of the leaf spring between the opposite edges.

17. The plate guide mechanism according to claim 1, wherein said at least one of the guide blocks of a plate is set in one of the guide tracks carrying the guide blocks by at least one rolling bearing.

18. The plate guide mechanism according to claim 17, wherein the guide tracks are parallel to a direction of motion for the plates, wherein said at least one of the guide blocks is equipped with two rolling beatings placed one after the other in the direction of motion for the plate.

19. The plate guide mechanism according to claim 17, wherein the guide tracks are parallel to a direction of motion for the plates, and said at least one rolling bearing is equipped with a roller placed parallel to the direction of motion for the plates.

20. The plate guide mechanism according to claim 1, wherein each said plate is carried by only one guide track per guide section.

21. The plate guide mechanism according to claim 1, wherein the plates extend longitudinally between guide tracks, said at least one plate includes a plate support running generally parallel to the longitudinal extension direction of the plate, and having a component diverting force away from the plane formed by the plate in a direction perpendicular to the plate.

22. The plate guide mechanism according to claim 21, wherein said plate support has a splayed area of the plate to provide a ventilation slot.

23. A guide mechanism for plates of a sun protection system under a translucent sun roof in a car, comprising at least two plates, with guide blocks attached at each end of a plate and at least two guide tracks, each of which carries at least one of the guide blocks belonging to the plate, placed at essentially constant intervals in guide sections, the invention comprising said plate having elastic spring devices that coact with the plates to reduce friction within the guide tracks.

24. A guide mechanism for plates of a sun protection system in an automobile, comprising at least two plates with guide blocks elastically attached and provided at each end of each of said two plates and at least two guide tracks, each guide track carrying at least one of the guide blocks belonging to each of the plates, said guide tracks placed at essentially constant intervals in a corresponding guide section, each of the guide blocks having spring means for countering torque forces, said spring means coacting with the plate.

25. The plate guide mechanism of claim 24, wherein said spring means includes a leaf spring.

* * * * *